United States Patent [19]
Tucker

[11] Patent Number: 6,076,881
[45] Date of Patent: Jun. 20, 2000

[54] FLIP HATCH TONNEAU COVER

[75] Inventor: W. David Tucker, Buffalo Grove, Ill.

[73] Assignee: Design Automotive Group, Inc., Lincolnshire, Ill.

[21] Appl. No.: 09/167,590

[22] Filed: Oct. 7, 1998

[51] Int. Cl.[7] .................................................. B60P 7/02
[52] U.S. Cl. .............................. 296/100.07; 296/100.1; 296/100.18
[58] Field of Search ......................... 296/100.01, 100.17, 296/100.18, 107.1, 108, 225, 100.1, 100.16, 100.14, 100.07, 100.06, 224, 216.02

[56] References Cited

U.S. PATENT DOCUMENTS

| | | |
|---|---|---|
| Re. 33,790 | 1/1992 | Huber . |
| 2,799,890 | 7/1957 | Stavich . |
| 2,989,340 | 6/1961 | Penner . |
| 3,012,814 | 12/1961 | Penner . |
| 3,051,523 | 8/1962 | Boyce-Smith et al. . |
| 3,489,456 | 1/1970 | Klanke . |
| 3,704,039 | 11/1972 | Dean . |
| 3,762,762 | 10/1973 | Beveridge et al. . |
| 3,773,380 | 11/1973 | Stockdill . |
| 3,785,698 | 1/1974 | Dean et al. . |
| 3,923,334 | 12/1975 | Key . |
| 4,079,989 | 3/1978 | Robertson . |
| 4,083,596 | 4/1978 | Robertson . |
| 4,124,247 | 11/1978 | Penner . |
| 4,210,361 | 7/1980 | Marvin et al. . |
| 4,324,429 | 4/1982 | Wilson et al. . |
| 4,522,440 | 6/1985 | Gostomski . |
| 4,615,557 | 10/1986 | Robinson . |
| 4,762,360 | 8/1988 | Huber . |
| 4,813,735 | 3/1989 | Avitable . |
| 4,861,092 | 8/1989 | Bogard . |
| 5,076,338 | 12/1991 | Schmeichel et al. . |
| 5,104,175 | 4/1992 | Enninga . |
| 5,213,390 | 5/1993 | Borchers . |
| 5,322,336 | 6/1994 | Isler . |
| 5,340,188 | 8/1994 | Goble . |
| 5,480,206 | 1/1996 | Hathaway et al. . |
| 5,487,585 | 1/1996 | Wheatley . |
| 5,503,450 | 4/1996 | Miller . |
| 5,522,635 | 6/1996 | Downey . |
| 5,573,295 | 11/1996 | Haddad, Jr. . |
| 5,584,521 | 12/1996 | Hathaway et al. . |
| 5,595,418 | 1/1997 | Medlin . |

*Primary Examiner*—Joseph D. Pape
*Assistant Examiner*—Greg Blankenship
*Attorney, Agent, or Firm*—Factor and Shaftal

[57] ABSTRACT

A support frame for a rail-based tonneau cover for open-topped vehicle enclosures, such as the beds of pick-up trucks, is provided having a pivotable portion, for permitting access to the truck bed without removing the cover from the rails. The support frame includes a latching mechanism for releasably latching the pivotable portion. The latching mechanism is itself accessible only upon lowering of the tailgate. A support is provided for holding up the pivotable portion in a raised position. The latching mechanism and the support are interconnected.

11 Claims, 6 Drawing Sheets

FLIP HATCH TONNEAU COVER

BACKGROUND OF THE INVENTION

1. The Technical Field

The present invention is directed to covers for open-topped vehicle enclosures, such as pickup truck beds, recreational boats, and open-topped trailers. In particular, the present invention is directed to cover systems using a flexible cover attached to a plurality of rails which may be attached to the tops of the side walls of the enclosure to be covered. Such covers are typically made of leather, vinyl, fabric, or similar materials.

2. The Prior Art

It is often desirable to provide a means to cover open-topped vehicle enclosures, such as those associated with pickup trucks or open-topped trailers, which are generally exposed to the elements. It may be desirable to cover such enclosures when not in use; when in use to protect the contents, especially during inclement weather; or to inhibit visual inspection of such enclosures, especially when such enclosures are loaded with cargo. In order to maximize the utility of such enclosures, it is desirable to provide a cover which affords easy access to the enclosure when desired.

Open-topped vehicle covers, commonly referred to as tonneau covers, are typically made of an expanse of flexible covering material which is either inherently resistant to the elements or has been specially treated for resistance to the elements. Numerous methods for attaching such covers directly to a vehicle or to a rail system attached to the vehicle are known in the art. Commonly used methods include the use of snap-type fasteners, hook-and-loop fasteners, and tongue-and-groove-type fasteners.

While the foregoing fasteners allow for relatively easy cover removal and attachment, such removal and attachment requires a number of discrete steps and is at times inconvenient and time-consuming. It would be desirable to provide a means of ready access to the enclosure which can be accomplished quickly and easily and involves a minimum number of steps.

One way to accomplish this objective is to attach the cover material to a frame system that is readily detachable from the enclosure, in whole or in part. An example of such a system has been disclosed by Hathaway, U.S. Pat. No. 5,480,206. The '506 patent discloses a cover attached to an articulated frame system wherein a portion of the frame is affixed to a pickup truck bed, while another portion of the frame system is hinged to pivot about the fixed section. A piston-cylinder unit is supplied to hold the hinged portion of the frame system in the open position. A conventional, quarter-turn latch mechanism is supplied to secure the hinged frame section in the closed position.

Isler, U.S. Pat. No. 5,322,336, discloses a cover attached to a single frame section that is hinged at the front wall of a pickup truck bed or similar enclosure. Piston-cylinder units support the rear of the frame when it is in the open position.

Goble, U.S. Pat. No. 5,340,188, discloses a cover attached to a single frame section that is hinged at the front wall of a pickup truck bed or similar enclosure. Pneumatic cylinder units support the rear of the frame when it is in the open position. A latch mechanism is supplied to secure the frame to the tailgate when the cover is in the closed position.

Wilson, U.S. Pat. No. 4,324,429, discloses a cover assembly that is hinged at the front wall of a pickup truck bed or similar enclosure. Springs are used to support the cover when it is in the open position. A latch mechanism is supplied to secure the cover to the tailgate or rear wall of the enclosure when the cover is in the closed position.

Bogard, U.S. Pat. No. 4,861,092, discloses a truck bed tonneau cover with front and rear panels. One embodiment contemplates the two panels connected by hinge means at the center of the truck bed. An alternate embodiment contemplates each of the panels connected by hinge means to a third section proximate the midpoint of the truck bed. In either embodiment, both the front or rear panel may be flipped about the hinge means onto the top of the adjacent panel(s). Each of the movable panels is provided with locking means.

It would be desirable to provide a cover system for open-topped vehicle enclosures which employs an articulated frame system that permits the user to quickly and easily open a portion of the cover, with means to hold the cover in place in the raised position.

It would further be desirable to provide an effective, positive latching mechanism for a pivotable tonneau cover which cannot be accessed unless the truck bed tail gate (or similar structure) has been opened, in order to provide improved security and control of access to the vehicle enclosure.

These and other objects of the invention will become apparent in light of the present specification, claims, and drawings.

SUMMARY OF THE INVENTION

The present invention comprises an apparatus for supporting a tonneau cover for an open-topped vehicle enclosure, wherein the enclosure has a plurality of side walls, at least two substantially opposing ones of the side walls each having an outer wall portion, a transversely extending top wall portion, and an inner wall portion descending from the top wall portion, at least one of the side walls being movable between an open position, and a closed position.

A first frame section includes at least two rail members operably configured to rest upon the top wall portions of, and be substantially affixed to, the at least two substantially opposing ones of the side walls of an open-topped vehicle enclosure. A second frame section includes at least two rail members operably configured to rest upon the top wall portions of the at least two substantially opposing ones of the side walls of an open-topped vehicle enclosure. The first and second frame sections may be configured for having a cover member releasably attached thereto for substantially covering the vehicle enclosure.

The first and second frame sections are pivotably connected, so that when the first frame section is substantially affixed to the at least two substantially opposing ones of the side walls of an open-topped vehicle enclosure, the second frame section may be pivotably raised to a raised position, to permit access to the enclosure, and lowered to a closed position on the side walls of the enclosure.

The second frame section may be releasably affixed in a closed position, the means for releasably affixing the second frame section being operably configured so that actuation thereof may be enabled only when the movable at least one side wall has been moved to its open position.

The second frame section is supported, when the second frame section is in its raised position. Means for releasably affixing the second frame section and means for supporting the second frame section are cooperatively associated with one another.

The supporting apparatus permits pivoting of the second frame portion, without requiring removal of a cover from the second frame section.

The means for supporting the frame section may further comprise biasing means, operably associated with the means for releasably affixing the second frame section, for biasing the means for releasably affixing the second frame section toward a latching position, when the second frame section is in a closed position, when the supporting apparatus is mounted upon the side walls of an open-topped vehicle enclosure.

The means for releasably affixing the second frame section may comprise at least one latch pin operably affixable to at least one of the at least two substantially opposing ones of the side walls of a vehicle enclosure. At least one latch plate is operably affixed to at least one of the at least two rail members of the second frame section, the at least one latch plate being pivotable, relative to the at least one of the at least two rail members, and relative to the at least one latch pin, between engaged and disengaged positions, relative to the at least one latch pin, when the at least one latch pin is operably affixed to at least one of the at least two substantially opposing ones of the side walls of a vehicle enclosure. Raising of the second frame section is substantially precluded when the at least one latch plate is in its engaged position.

The biasing means may comprise a biasing member, operably connectable to the at least one latch plate and an adjacent side wall of an open-topped vehicle enclosure, for prompting the at least one latch plate into its engaged position, when the second frame section is in its lowered position on an open-topped vehicle enclosure.

The biasing means may be operably configured to permit the at least one latch plate to be selectively moved to its disengaged position, for, in turn, enabling the second frame section to be raised, whereupon the biasing means is further configured for prompting the second frame section toward its raised position. In a preferred embodiment of the invention, the biasing means comprises a gas strut.

The hinge means may comprise at least one first hinge member, operably associated with one of the first and second frame sections and at least one second hinge member, operably associated with the other of the first and second frame sections. The at least one first and second hinge members are cooperatively engaged with one another, for enabling pivoting of the at least one second hinge member relative to the at least one first hinge member.

The hinge means further may comprise an arcuate slot operably disposed in one of the at least one first and second hinge members; and a longitudinally extending bead, operably connected by at least one web member, to the other of the at least one first and second hinge members. The bead is operably configured to be insertably received within and pivotable relative to the arcuate slot.

The supporting apparatus may further comprise locking means for releasably locking the second frame section in its lowered position. The locking means may further comprise a strike plate operably affixable to one of the second frame section and a side wall of a vehicle enclosure; and a lockable bolt member operably affixable to the other of the second frame section and a side wall of a vehicle enclosure. The strike plate and the lockable bolt member are cooperatively arranged, so that when the second frame section is in its lowered position, the lockable bolt member may be brought into engagement with the strike plate for substantially precluding the raising of the second frame section.

The supporting apparatus may further comprise means for releasably affixing a cover member to the first and second frame sections.

BRIEF DESCRIPTION OF DRAWINGS

FIG. 8a is a perspective view of the latch plate portion of the latching mechanism according to an alternative embodiment of the invention.

FIG. 8b is a side elevation, partially in section, of the ramp block, extension and rail adapter of the latching mechanism of the embodiment of FIG. 8a.

BEST MODE FOR CARRYING OUT THE INVENTION

While the present invention is susceptible of embodiment in many different forms, several embodiments are shown in the drawings and are described in detail herein, with the understanding that the present disclosure is to be considered an example of the principles of the invention, and is not intended to limit the invention to the embodiments illustrated.

Figure 1:
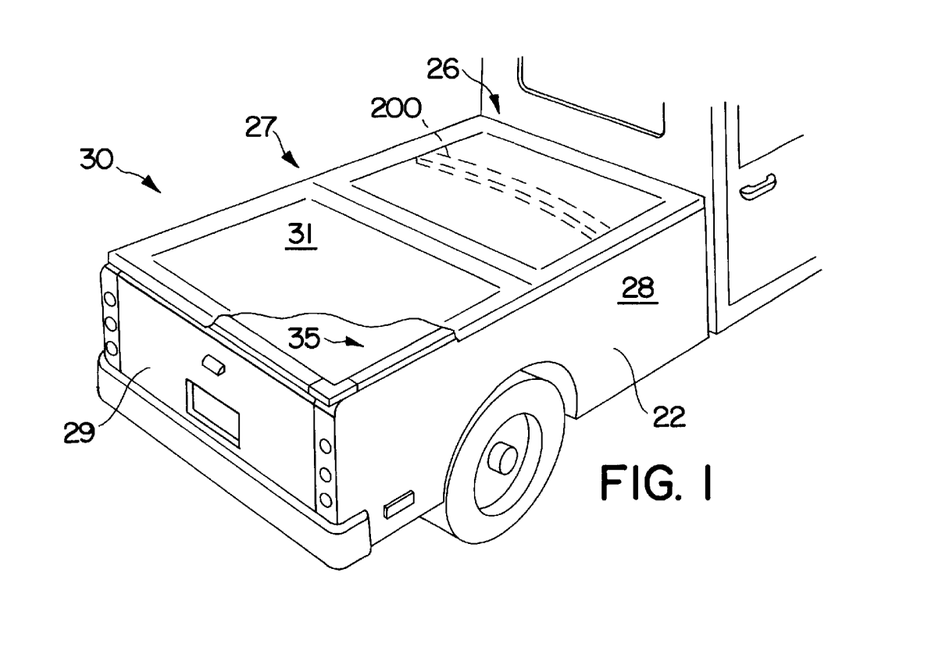
FIG. 1 is a perspective view of a pickup truck having a cover system according to the present invention.

FIG. 1 is a perspective view of a pickup truck 22 with a flip hatch tonneau cover system 30, in accordance with the present invention. The rear of the pickup truck constitutes an enclosure with an open top and four walls. Front (or cab) wall 26 and side walls 27 and 28 are fixed. Tailgate 29 is moveable. Tailgate 29 is shown in a closed, or upright, position. In the closed position, tailgate 29 comprises the fourth, and rear, wall of the enclosure. Tailgate 29 may be repositioned to an open, or substantially horizontal, position, thus providing access to the enclosure from the rear.

The main components of cover system 30 are cover 31, frame system 35 and latch mechanism 60 (shown and described in detail with respect to FIGS. 5–9). Cover 31 is made of a flexible material that has been treated to be, or is inherently, resistant to the elements. Typical cover materials include leather, canvas, vinyl, fabric, fabric-reinforced vinyl, heavy plastic, and the like. Cover 31 may be removably attached to frame system 35 by conventional means such as snap-type fasteners, hook-and-loop fasteners, or other fasteners known in the art. Frame system 35 is fastened to the tops of walls 26, 27, and 28, in a manner to be described hereinafter.

Typically, each truck bed side wall, e.g., side wall 27, includes an outer wall 27a, top wall 27b, downwardly extending inner lip 27c.

Figure 2:
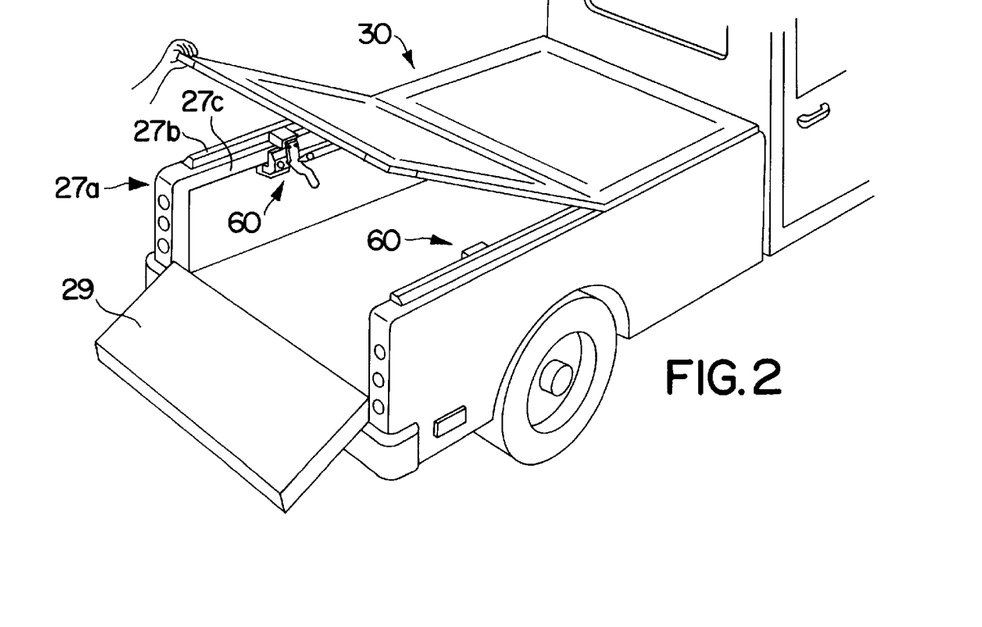
FIG. 2 is a further perspective view of the cover system of the present invention, with the hatch portion raised.
Figures 3, 3A, 3B, 4:
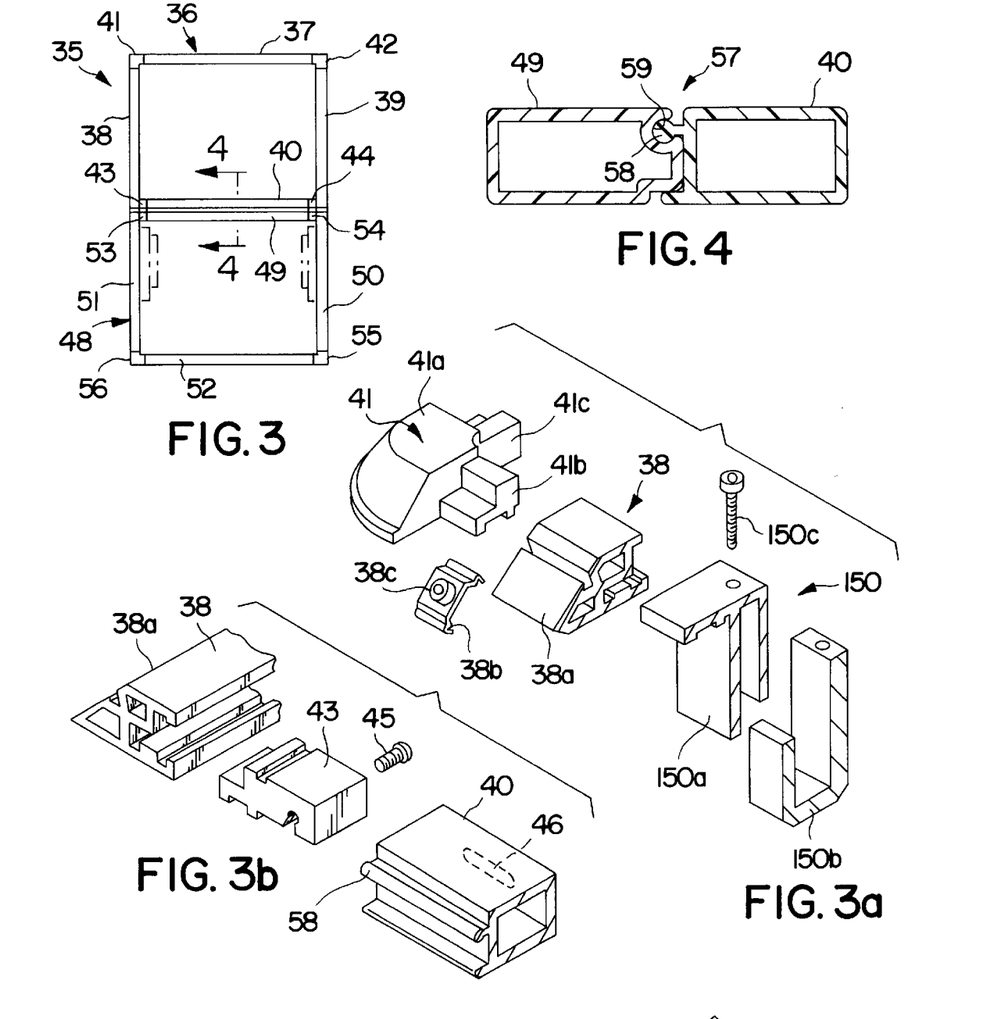
FIG. 3. is a top plan view of the rail system for the tonneau cover system according to FIGS. 1 and 2.
FIG. 3a is a perspective exploded view of a portion of rail member, with a corner member and a clamp structure, for affixing a portion of the rail system to the truck bed.
FIG. 3b is a perspective exploded view of a portion of the cross member with a corner member for attaching the cross member to the side rails of the rail system.
FIG. 4 is a side elevation in section taken along lines 4—4 of FIG. 3.
Figure 3C:
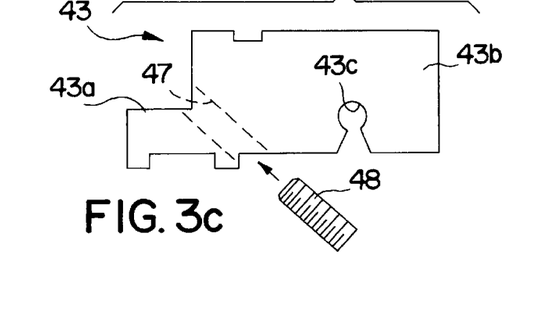
FIG. 3c is a side elevation of a cross member fitting.

As demonstrated in FIG. 2, cover system 30 is configured so that a portion of the cover may be raised, relative to another portion of the cover. FIG. 3 is a plan view of frame system 35. Frame system 35 is formed as two articulably connected rectangular frame sections. Forward frame section 36 includes front rail member 37, side rail members 38 and 39, cross member 40, corner members 41, 42, and cross member fittings 43 and 44. Front rail member 37 is connected to side rail members 38 and 39 by corner members 41 and 42. Cross member 40 is connected to side rail members 38 and 39 by cross member fittings 43 and 44. Front rail member 37 may be attached to the top of front wall 26 by conventional means, such as clamps or threaded fasteners. Side rail members 38 and 39 are similarly attached to side walls 27 and 28. Cross member 40 preferably spans the enclosure near the enclosure's longitudinal midpoint, although the longitudinal proportions of forward frame section 36 to rear frame section 48 may be varied, to vary the length of the flip hatch portion.

Rear frame section 48 includes cross member 49, side rail members 50 and 51, rear rail member 52, and cross member fittings 53, 54, and corner members 55 and 56. Cross member 49 is connected to side rail members 30 and 31 by cross member fittings 53 and 54. Rear rail member 52 is connected to side rail members 30 and 31 by corner members 55 and 56. Cross member 49 is articulably connected to cross member 40. When rear frame section is in the lowered position, as shown in FIG. 1, side rail members 50 and 51 rest atop, but are not attached to, side walls 27 and 28. Rear rail member 52 spans, but is not attached to, tailgate 29.

Apart from cross members 40 and 49, the remaining components of frame 35 (i.e., the cab and tailgate rails, the side rails, and the corner members which connect the cab/tailgate rails to the side rails, may be configured substantially similar to the rails depicted in Tucker, U.S. Pat. No. 5,152,574, or Tucker, U.S. Pat. No. 5,261,719, the complete disclosure of which patents are expressly incorporated herein by reference.

For example, FIG. 3a illustrates a section of rail 38, corner member 41, clamp structure 150, including upper clamp member 150a, lower clamp member 150b and bolt 150c. Rail 38 includes a face 38a, to which a marine-type snap fastener 38b can be removably affixed. Snap fastener 38b has a male snap element 38c which may be configured to engage a female snap element affixed to the periphery of a tonneau cover (not shown). While this particular rail cross-sectional configuration and method of attaching a cover to the rail are shown, as one possible embodiment, other suitable frame rail configurations and methods of attaching the cover to the rail(s) may be used without departing from the scope of the present invention.

Corner member 41 includes center section 41a and attachment members 41b and 41c. The cross-sections of attachment members 41b and 41c are shaped to conform to the interior of the inside facing portion of rail 38 and of the cab rail (not shown), so that the attachment members can be inserted into the ends of the respective rail members. A setscrew or the like may be used to attach the corner member to the respective rail members. The other rail members (apart from the cross members) can be similarly assembled to one another.

The aforementioned cab rail and corresponding side rails may be affixed to the side walls of the truck bed, using clamp structures, such as are disclosed in the Tucker '574 and '719 patents. That is, referring again to FIG. 3a, upper clamp member 150a is configured to be received within and engage the interior of the inward facing portion of rail member 38. Lower clamp member 150b is configured to engage the downwardly depending portion of the truck bed side wall and engages and is vertically adjusted relative to upper clamp member 150a via bolt 150c.

FIG. 3b illustrates a cross member fitting, such as cross member fitting 43, which attaches rail member 38 to cross member 40. In FIG. 3b, cross member fitting 43 is shown, as is a section of cross member 40. Cross member fitting 43 includes rail connecting portion 43a, and stem portion 43b. Rail connection portion 43a has a cross-section configured to be insertably received into the inner facing slot in rail member 38 (in the manner described relative to FIG. 3a). Since cross member 40 has a relatively simple rectangular interior cross sectional configuration, stem portion 43b has a substantially rectangular cross sectional configuration. Cross member fitting 43 preferably is held in place in cross member 40 by a setscrew or similar device. For example, stem portion 43b of cross member fitting 43 may include a transversely extending key-hole shaped slot 43c for receiving a self-tapping metal screw 45 which may be inserted through slot 46 in the side of cross member 40, for affixing cross member 40 to cross member fitting 43. To hold cross member fitting 43 in rail member 38, fitting 43 may be provided with a threaded bore 47, into which a set screw 48 is received, to frictionally engage the interior of the inner facing slot in rail member 38. Typically, fitting 43 will be positioned at the end of rail member 38.

Fitting 44 may be substantially identical, or a mirror image of, fitting 43, to receive a screw passing through a slot similar to slot 46, located in the opposite end of cross member 40. Fittings 53, 54 preferably will be similarly configured to engage the ends of cross member 49 and corresponding rails 48, 50.

FIG. 4 shows a side view of the hinged connection between forward frame section 36 and rear frame section 48. Hinge 57 is formed by longitudinally elongated hinge bead 58 and longitudinally elongated hinge groove 59. In one embodiment of the invention, and as shown in FIG. 4, bead 58 is integral with forward cross member 40, while groove 59 is integral with rear cross member 49. In an alternate embodiment of the invention, the positions of the bead 58 is integral with cross member 49, while groove 59 is integral with cross member 40. Bead 58 is of solid, substantially circular cross section. It engages with groove 59, which is of arcuate cross section, the arcuate section defining an arc greater than 180 degrees and less than 360 degrees. The relative geometries of bead 58 and groove 59 preclude bead 58 from becoming inadvertently disengaged from groove 59.

Figures 5, 6:
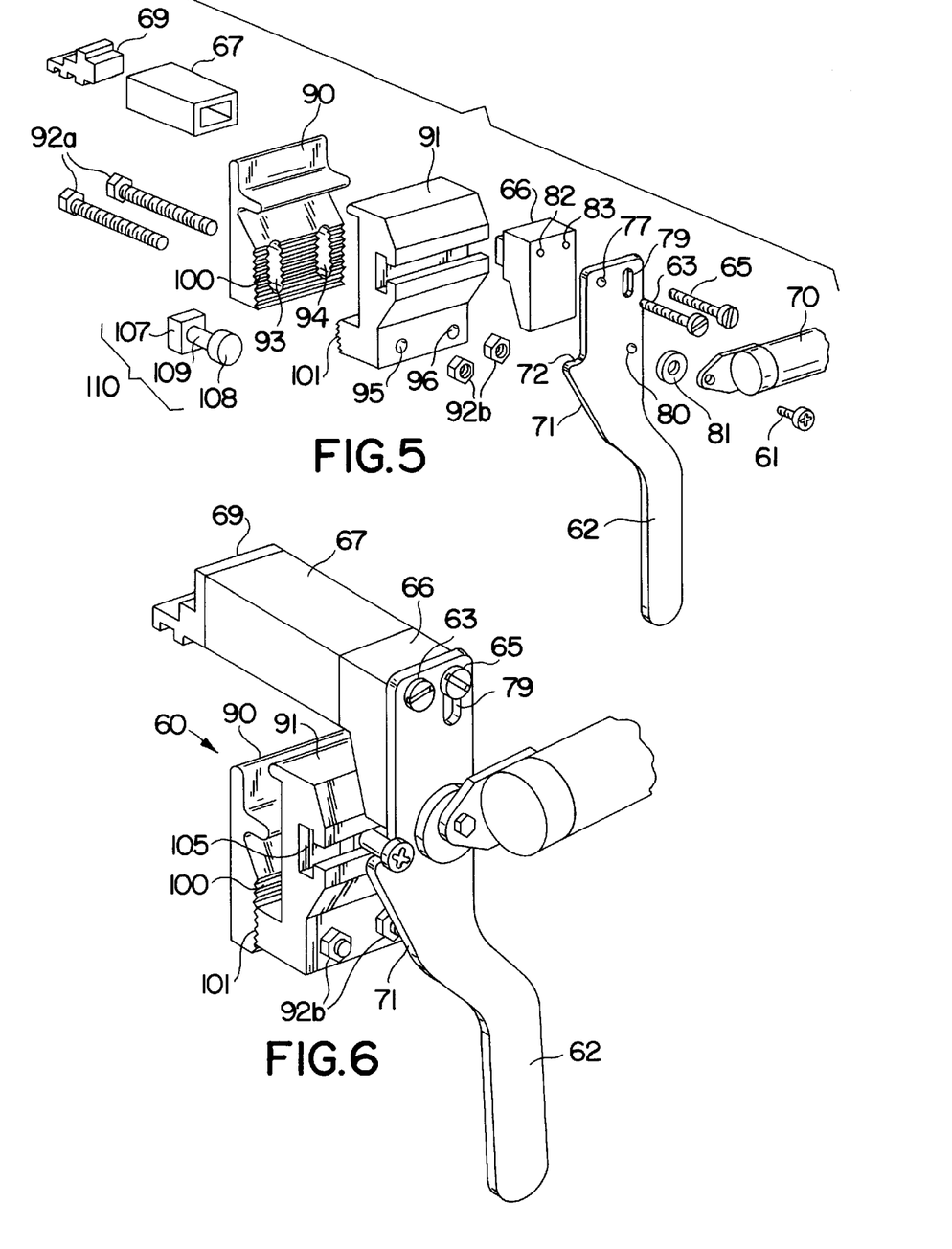
FIG. 5 is an exploded perspective view of the rail system latch mechanism.
FIG. 6 is a fragmentary assembled perspective view of the latch for the tonneau cover system.

FIG. 5 is an exploded perspective view of latch mechanism 60. The main components of latch mechanism 60 are configured to be affixed to one or both of the side rails of the movable portion of frame system 35, and the truck bed side wall adjacent thereto. Rail adapter 69 preferably has a cross-section configured to fit in the inner channel of the side rail. The side rail (not shown) may have a cross-section substantially similar to that of rail segment 38, shown in FIG. 3a. Rail adapter 69 may be slidably moved longitudinally along the rail segment, and after the desired position is found, secured in place in the inner rail channel by means of a setscrew.

Extension 67 connects ramp block 66 to rail adapter 69. Extension 67 preferably is an extruded tube (e.g., aluminum) which may be force-fitted onto projections on ramp block 66 and rail adapter 69. Rail adapter 69 may be provided with threaded blind bores 69a, into which the ends of bolts 63, 65 may be received.

Latch plate 62 includes ramp edge 71, detent 72 and handle 73. Apertures 77 and 79 are located adjacent the upper edge of latch plate 62. Aperture 79 is an elongated slot, which may or may not be arcuate, as well. Ramp block 66 has two threaded bores 82 and 83. Pivot bolt 63 passes through aperture 77 to connect latch plate 62 to ramp block 66. Anti-rotation bolt 65 passes through slotted aperture 79. Bolts 63 and 65 hold latch plate 62 closely but not bindingly to ramp block 66, leaving sufficient clearance to allow latch plate 62 to pivot about pivot pin 63 without binding and without excessive lateral play. Slotted aperture 79 permits latch plate 62 to rotate through a limited arc of movement. In an embodiment of the invention, pivot pin 63 and anti-rotation pin 65 may be fabricated as shoulder bolts with shoulder lengths equal to the thickness of latch plate 62, plus a suitable clearance, in accordance with otherwise conventional techniques of machine design, as would be known to one skilled in the art having the present disclosure before them.

FIG. 6 is a perspective view of the assembled latch mechanism 60 in the configuration in which it would be installed in a truck bed. Strut 70 is attached to latch plate 62 by means of washer 81 and bolt 61, bolt 61 being threaded into hole 80. Although only one hole 80 is shown, a plurality of holes 80, extending up and down latch plate 62, may be provided, to accommodate different installation configurations, for attaching strut 70 to latch plate 80.

Latch clamp member 90 and latch clamp member 91, are provided with slots 93, 94 and bores 95, 96, respectively. Bolts 92a (passing through slots 93, 94 and bores 95, 96) and nuts 92b are used to fasten latch clamp members 90 and 91 about the downwardly extending inner lip 27c. See FIGS. 8, 8c–8f. Teeth 100 extend longitudinally across the lower face of latch clamp member 90. Teeth 101 extend longitudinally across the lower face of latch clamp member 91. When latch clamp members 90 and 91 are joined to inner lip 27c, slots 93, 94 permit relative vertical adjustment of latch clamp member 90 and 91, with respect to one another, with teeth 100, 101 holding clamp member 90, 91 in the desired relative vertical orientation, following tightening down of bolts 92a and nuts 92b. Flanges 103 and 104 grip inner lip 27c.

Latch clamp member 91 has, on its inner face, a transverse slot 105. Nut 107, latch pin 108 and bushing 109 together form latch pin assembly 110. Latch pin 108 is inserted through bushing 109 prior to being threaded into nut 107. Bushing 109 preferably may be made of nylon or similar semi-resilient material. The location of nut 107 and latch pin 108 may be adjusted over substantially the entire length of slot 105. Preferably, nut 107 has a thickness which is slightly less than the depth of slot 105 behind lips 106. By partially threading latch pin 108 into nut 107, nut 107 is then inserted and slid into slot 105. Thereafter, latch pin 108 is tightened down, and latch pin 108 presses nut 107 into the inner surfaces of lips 106.

Figure 7:
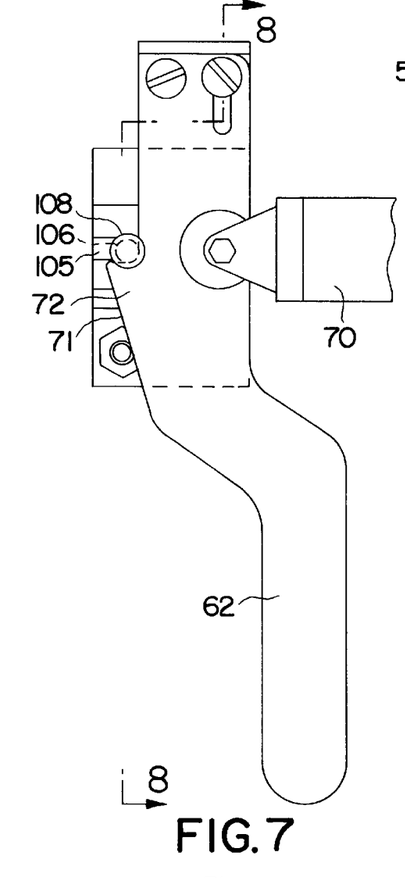
FIG. 7 is a fragmentary side elevation of the latch, corresponding to a lowered condition of the flip hatch.
Figure 8:
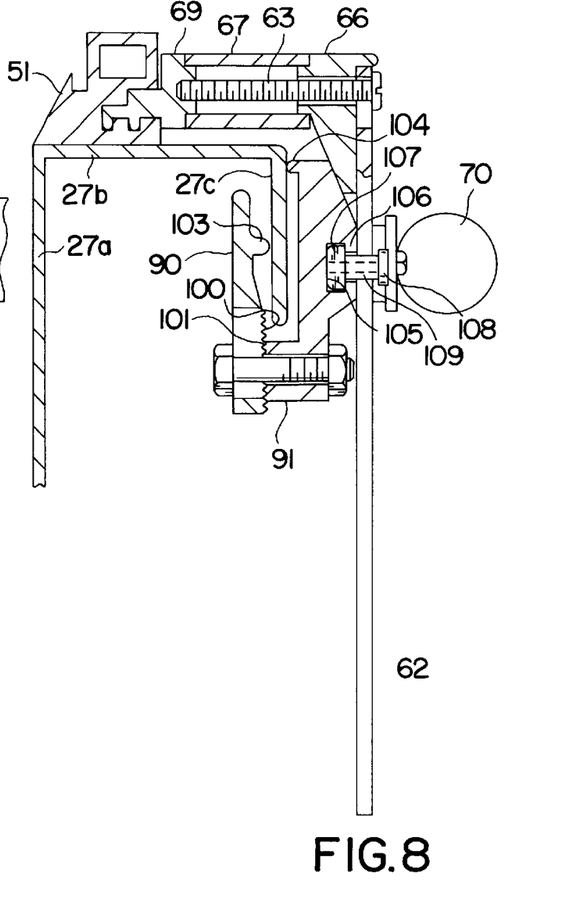
FIG. 8 is a side elevation in section, showing a side wall of the truck bed and the latch, corresponding to a lowered position of the flip hatch.

FIGS. 7 and 8 illustrate latch mechanism 60 mounted to truck bed side wall 27. Strut 70 includes cylinder 70a and a piston (not shown). Cylinder 70a will be connected to latch plate 62 in the manner previously described. The piston will be pivotably connected at its distal end to the truck bed side wall at a suitable location. FIG. 8 illustrates how clamp members 90, 91 clamp latch pin assembly 110 to the truck bed side wall. FIGS. 8c–8f further illustrate clamp members 90, 91.

Figures 8A, 8B:
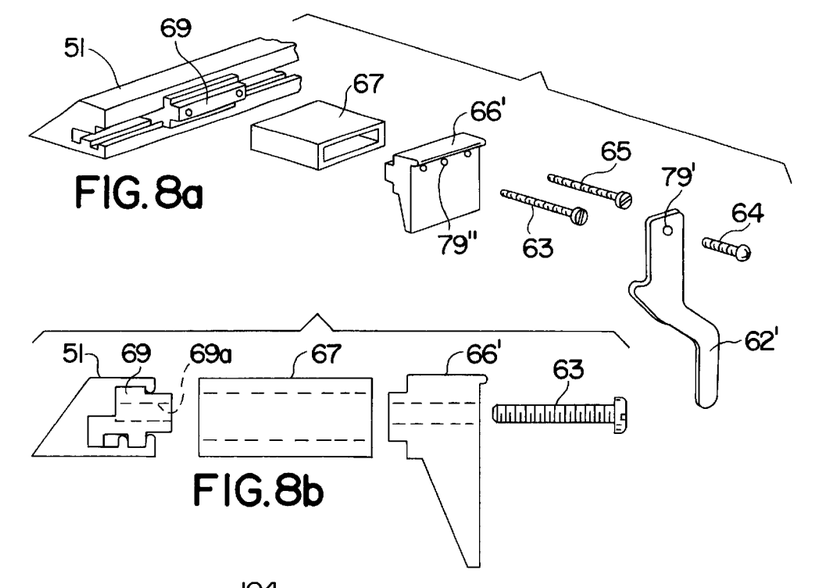
Figures 8C, 8D:
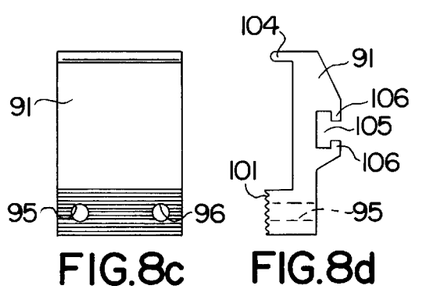
FIG. 8c is a front elevation of one of the clamp members for the latching mechanism.
FIG. 8d is a side elevation of one of the clamp members for the latching mechanism.
Figure 8E:
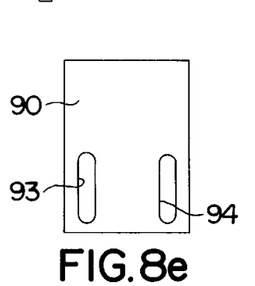
FIG. 8e is a front elevation of the other of the clamp members for the latching mechanism.
Figure 8F:
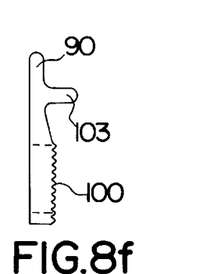
FIG. 8f is a side elevation of the other of the clamp members for the latching mechanism.

An alternative embodiment of the latch plate structure is shown in FIGS. 8a and 8b. In this embodiment, latch plate 62' has only a single aperture 79', through which a bolt 64 passes, to engage thread in blind bore 79" in ramp block 66'.

In a preferred embodiment of the invention, when the latch mechanism is mounted onto a truck bed, when the pivotable portion of the tonneau cover is down, and the latch is engaged, as shown in FIG. 7, strut 70 is under compression, exerting force in the direction of the arrow. Strut 70 pivotally biases latch plate 62 about pivot pin 63 so that detent 72 on latch plate 62 securely engages with latch pin 108.

Figure 8G:
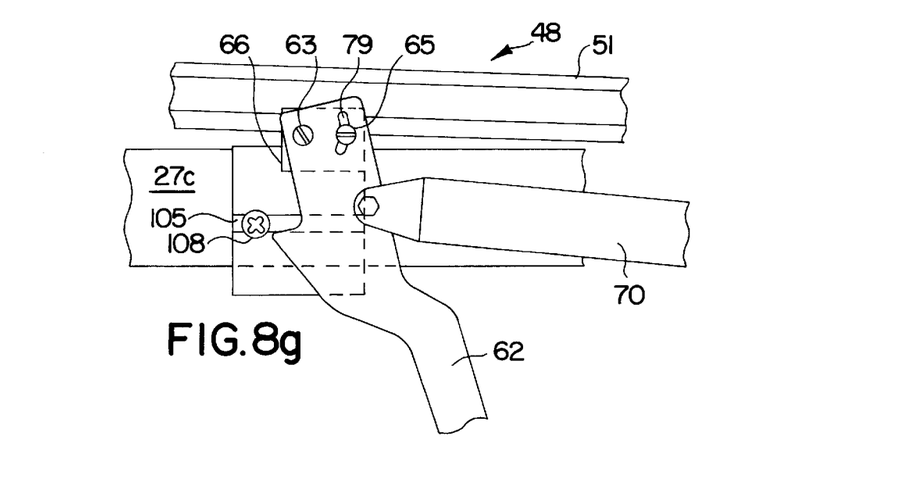
FIG. 8g is a side elevation illustrating rotation of the latch plate, for releasing the rear frame section, to permit raising thereof.
Figure 9A:
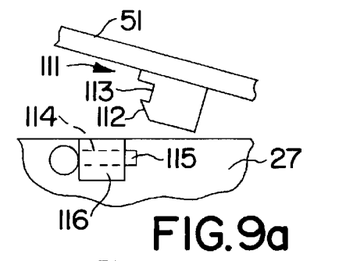
FIG. 9a is a schematic illustration of a further latching mechanism according to an alternative embodiment of the invention.
Figure 9B:
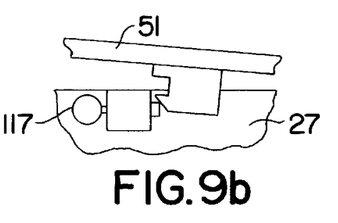
FIG. 9b is a further schematic illustration of the latching mechanism of FIG. 9a, shown in an early stage of the latching process.
Figure 9C:
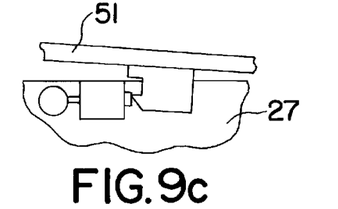
FIG. 9c is a further schematic illustration of the latching mechanism of FIG. 9a, shown in a later stage of the latching process.
Figure 9D:
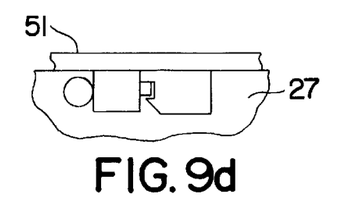
FIG. 9d is a still further schematic illustration of the latching mechanism of FIG. 9a, shown in the final stage of the latching process.

To release the latch and raise frame section 48 (FIG. 8g), first, the tailgate 29 must be dropped and/or the cover at least partially removed from the frame. Latch plate 62 is pushed forward, toward the front of the truck bed, to compress strut 70. Simultaneously, latch plate 62 pivots about bolt 63, in a counterclockwise manner (as seen in FIG. 8g). During this rotation, detent 72 moves down and out from under latch pin 108. The pivotable section 48 of frame system 35 can then be raised. Once latch plate 62 has cleared pin 108, plate 62 will, under the action of strut 70, be rotated clockwise, until bolt 65 engages the top of slot 79, preventing further pivoting of latch plate 62.

Since strut 70 is always under compression, once latch plate 62 has been released from latch pin 108, strut 70 assists in raising section 48 and, depending upon the strength of the strut(s) 70, may hold section 48 in its raised position.

To return rear frame section 48 from its raised to its lowered position, rear frame section 48 is pushed downward.

As rear frame section 48 moves towards its lowered position, latch pin 108 contacts ramp 71. As rear frame section 48 continues to be lowered, latch pin 108 will cause latch plate to pivot counterclockwise about pin 63, against the resistance provided by strut 70. When rear frame section 48 has been lowered to the point where latch pin 108 has cleared ramp 71, strut 70 forces latch plate 62 to rotate clockwise until detent 72 moves under latch pin 108 thus securing rear frame section 48 in the lowered position.

In the embodiment of FIGS. 8a and 8b, when the latch plate 62' engages pin 108, strut 70 will hold latch plate 62' against the pin 108. When latch plate 62' clears pin 108, plate 62' will, under the action of strut 70, will be rotated about bolt 64, until plate 62' becomes substantially aligned with strut 70. In order to prevent such substantial rotation of plate 62', a stop member (not shown) may be provided on ramp block 66'.

Although only one latch mechanism and strut combination has been described and shown, it is understood that a mirror-image arrangement may be provided on the opposite side of the truck bed, so that both sides of section 48 may be supported.

FIGS. 9a–9d depict a locking mechanism for the present invention, which may be used, in addition to the latching mechanism described above, to lock rear frame section 48 in the closed or lowered position. In this embodiment, strike plate 111 is installed, e.g., on side rail member 51. Strike plate 111 may be mounted to elements such as rail adapter 69, extension 67 and ramp block 66, as described above. Strike plate 111 incorporates ramp 112 and notch 113. Lock 114 is attached to side wall 27. Lock 114 has a bolt member 11 5 which is biased outwardly, to the position illustrated in FIG. 9a. When rear frame section 48 is lowered towards the locked position, ramp 112 contacts bolt member 115. As ramp 112 continues to move towards the closed position, ramp 112 causes bolt member to be depressed into lock cylinder 116. After ramp 114 has completely cleared bolt member 115, bolt member 115 is biased into and becomes engaged with notch 113. To re-open rear frame section 48, lock 114 must be actuated with a key, e.g., key 117, to withdraw bolt member 115 from notch 113. Preferably, key 117 may be removable, so that upon locking down section 48, and removal of key 117, section 48 is substantially secured, even if tailgate 29 is dropped or cover 31 is removed and access to latching mechanism(s) 60 is obtained.

Alternatively, lock 114 may be attached to side rail member 51 and strike plate 111 may be attached to side wall 27. In a further alternative embodiment, one such lock assembly may be installed on each sides of rear frame section 48 and both side walls 27 and 28.

Figures 10, 11, 12, 13:
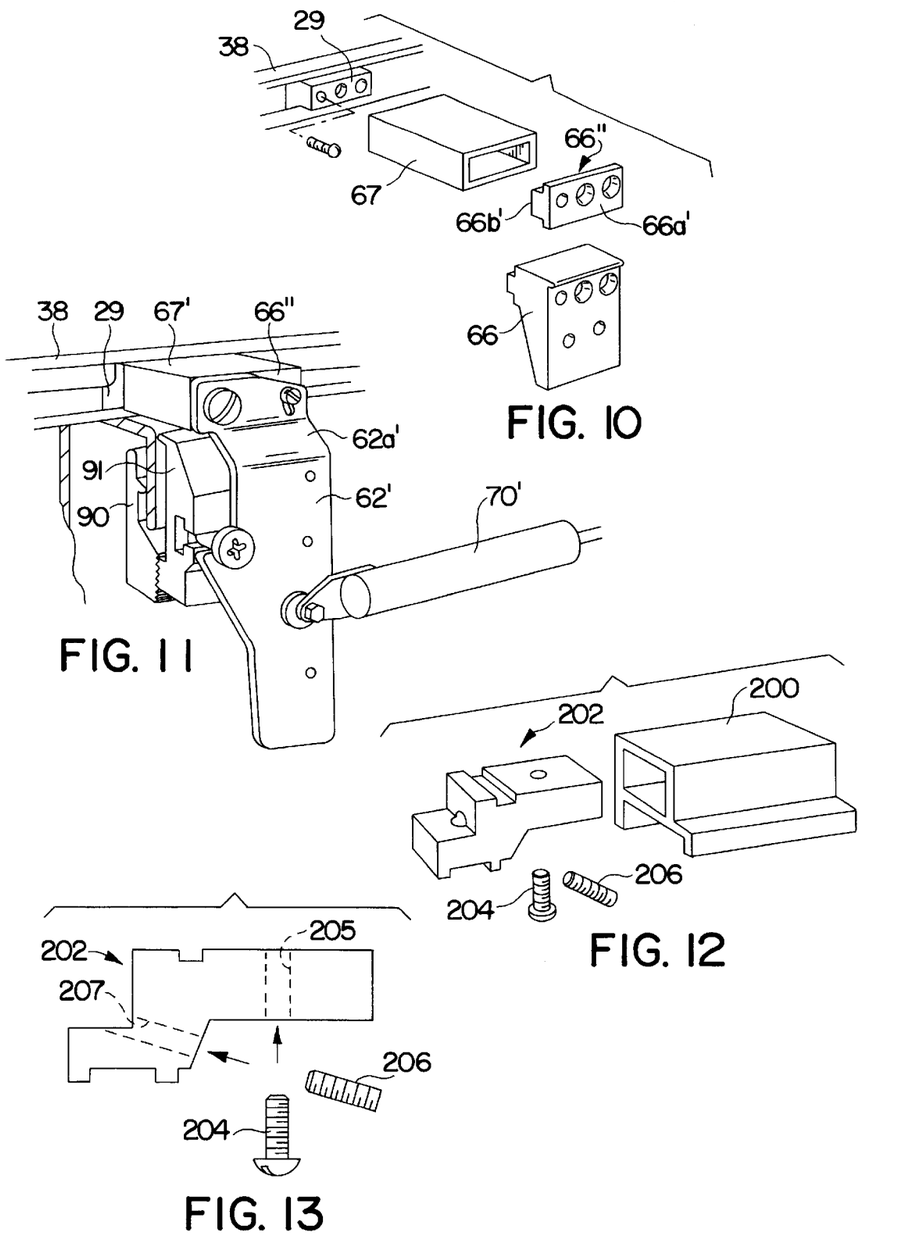
FIG. 10 is a perspective view of an alternative embodiment of a portion of the latching mechanism.
FIG. 11 is a further perspective view of the alternative embodiment of FIG. 10.
FIG. 12 is an exploded perspective view of an end of a cross bow and its attachment member.
FIG. 13 is a side elevation of a cross bow attachment member.

As shown in FIGS. 5, 6 and 8, the drawings, ramp block 66 may have a downwardly extending wedge-shaped section with an inclined underneath surface. Alternatively, as shown in FIG. 10, block 66" may have a substantially planar vertical inner face 66a' from which a mounting tenon 66b' extends. In the alternative embodiment of FIGS. 10 and 11, a modified version of latch plate 62, namely plate 62', having an inclined portion 62a', will be used.

In order to support the cover in an elevated, convex configuration, to prevent pooling of rainwater, sagging under the weight of snow, etc., one or more cross-bows 200 may be provided (see FIGS. 1 and 12–13). Each cross-bow 200 preferably is mounted onto two attachment members 202, such as by sliding the ends of the curved bow onto the generally rectangular ends of the attachment members, and held in place such as by set screws 204 received in apertures 205. The rail connecting ends of attachment members 202 have cross-sectional configurations which are shaped to fit into the cross-sections of the inner slots of the rails, similar to the way that the corner members and the cross member fittings connect with the rails, and may be affixed by further set screws 206 received in apertures 207.

The foregoing description and drawings merely explain and illustrate the invention. The invention is not limited thereto except to the extent that the appended claims are so limited, as those skilled in the art who have the disclosure before them will be able to make modifications and variations therein without departing from the scope of the invention.

I claim:

1. An apparatus for supporting a tonneau cover for an open-topped vehicle enclosure, wherein the enclosure has a plurality of side walls, at least two substantially opposing ones of the side walls each having an outer wall portion, a transversely extending top wall portion, and an inner wall portion descending from the top wall portion, at least one of the side walls being movable between an open position, and a closed position, the supporting apparatus comprising:

a first frame section including at least two rail members operably configured to rest upon the top wall portions of, and be substantially affixed to, the at least two substantially opposing ones of the side walls of an open-topped vehicle enclosure;

a second frame section including at least two rail members operably configured to rest upon the top wall portions of the at least two substantially opposing ones of the side walls of an open-topped vehicle enclosure;

the first and second frame sections being configured for having a cover member releasably attached thereto for substantially covering the vehicle enclosure;

means for pivotably connecting the first and second frame sections, so that when the first frame section is substantially affixed to the at least two substantially opposing ones of the side walls of an open-topped vehicle enclosure, the second frame section may be pivotably raised to a raised position, to permit access to the enclosure, and lowered to a closed position on the side walls of the enclosure;

means for releasably affixing the second frame section in a closed position, the means for releasably affixing the second frame section being operably configured so that actuation thereof is enabled only when the movable at least one side wall has been moved to its open position;

means for supporting the second frame section, when the second frame section is in its raised position, the means for releasably affixing the second frame section and the means for supporting the second frame section being cooperatively associated with one another, the supporting apparatus permitting pivoting of the second frame portion, without requiring removal of a cover from the second frame section.

2. The supporting apparatus according to claim 1, wherein the means for supporting the frame section further comprises biasing means, operably associated with the means for releasably affixing the second frame section, for biasing the means for releasably affixing the second frame section toward a latching position, when the second frame section is in a closed position, when the supporting apparatus is mounted upon the side walls of an open-topped vehicle enclosure.

3. The supporting apparatus according to claim 2, wherein the means for releasably affixing the second frame section comprises:

at least one latch pin operably affixable to at least one of the at least two substantially opposing ones of the side walls of a vehicle enclosure;

at least one latch plate operably affixed to at least one of the at least two rail members of the second frame section, the at least one latch plate being pivotable, relative to the at least one of the at least two rail members, and relative to the at least one latch pin, between engaged and disengaged positions, relative to the at least one latch pin, when the at least one latch pin is operably affixed to at least one of the at least two substantially opposing ones of the side walls of a vehicle enclosure, raising of the second frame section being substantially precluded when the at least one latch plate is in its engaged position.

4. The supporting apparatus according to claim 3, wherein the biasing means comprises a biasing member, operably connectable to the at least one latch plate and an adjacent side wall of an open-topped vehicle enclosure, for prompting the at least one latch plate into its engaged position, when the second frame section is in its lowered position on an open-topped vehicle enclosure.

5. The supporting apparatus according to claim 4, wherein the biasing means are operably configured to permit the at least one latch plate to be selectively moved to its disengaged position, for, in turn, enabling the second frame section to be raised, whereupon the biasing means is further configured for prompting the second frame section toward its raised position.

6. The supporting apparatus according to claim 5, wherein the biasing means comprises a gas strut.

7. The supporting apparatus according to claim 1, wherein the hinge means comprises:

at least one first hinge member, operably associated with one of the first and second frame sections;

at least one second hinge member, operably associated with the other of the first and second frame sections, the at least one first and second hinge members being cooperatively engaged with one another, for enabling pivoting of the at least one second hinge member relative to the at least one first hinge member.

8. The supporting apparatus according to claim 7, wherein the hinge means further comprises:

an arcuate slot operably disposed in one of the at least one first and second hinge members;

a longitudinally extending bead, operably connected by at least one web member, to the other of the at least one first and second hinge members, the bead being operably configured to be insertably received within and pivotable relative to the arcuate slot.

9. The supporting apparatus according to claim 1, further comprising:

locking means for releasably locking the second frame section in its lowered position.

10. The supporting apparatus according to claim 9, wherein the locking means further comprises:

a strike plate operably affixable to one of the second frame section and a side wall of a vehicle enclosure;

a lockable bolt member operably affixable to the other of the second frame section and a side wall of a vehicle enclosure, the strike plate and the lockable bolt member being cooperatively arranged, so that when the second frame section is in its lowered position, the lockable bolt member may be brought into engagement with the strike plate for substantially precluding the raising of the second frame section.

11. The supporting apparatus according to claim 1, further comprising means for releasably affixing a cover member to the first and second frame sections.

* * * * *